(12) United States Patent
Brian

(10) Patent No.: US 10,266,428 B1
(45) Date of Patent: Apr. 23, 2019

(54) GALVANIC WATER PROCESSING APPARATUS

(71) Applicant: Steve Brian, Bedford, NH (US)

(72) Inventor: Steve Brian, Bedford, NH (US)

(*) Notice: Subject to any disclaimer, the term of this patent is extended or adjusted under 35 U.S.C. 154(b) by 0 days.

(21) Appl. No.: 15/899,989

(22) Filed: Feb. 20, 2018

Related U.S. Application Data

(60) Provisional application No. 62/462,562, filed on Feb. 23, 2017.

(51) Int. Cl.
| | | |
|---|---|---|
| C02F 1/461 | (2006.01) | |
| C02F 1/46 | (2006.01) | |
| C02F 103/06 | (2006.01) | |

(52) U.S. Cl.
CPC ........ C02F 1/4606 (2013.01); C02F 1/46109 (2013.01); C02F 1/46176 (2013.01); *C02F 2001/46171* (2013.01); *C02F 2103/06* (2013.01); *C02F 2303/04* (2013.01)

(58) Field of Classification Search
CPC .......... C02F 1/4606; C02F 1/46109; C02F 1/46176; C02F 2001/46171; C02F 2103/06; C02F 2303/04
See application file for complete search history.

(56) References Cited

U.S. PATENT DOCUMENTS

| | | | | |
|---|---|---|---|---|
| 3,486,999 A | * | 12/1969 | Craft | ..... C02F 1/4602 137/240 |
| 2006/0254929 A1 | * | 11/2006 | Mikio | ..... C02F 1/46176 205/742 |

\* cited by examiner

*Primary Examiner* — Ciell P Thomas
(74) *Attorney, Agent, or Firm* — Luis Figarella

(57) ABSTRACT

A water well immersion device intended for the treatment of water within wells based galvanic current generation. The unit maintains the continuous generation of galvanic electricity as the components age through adjustable mechanical features that ensure the continuous optimal connectivity between the galvanic electricity generating components.

7 Claims, 2 Drawing Sheets

GALVANIC WATER PROCESSING APPARATUS

CROSS-REFERENCE TO RELATED APPLICATIONS

This application claims priority to U.S. Provisional patent application Ser. No. 62/462,562 titled "Galvanic Water Processing Apparatus", filed on Feb. 23, 2017 the disclosure of which is herein incorporated by reference in its entirety.

PATENTS CITED

The following documents and references are incorporated by reference in their entirety, Jones (U.S. Pat. No. 2,449,706), Green (U.S. Pat. No. 3,379,633), Hradil (U.S. Pat. No. 6,287,450), Collier et al (U.S. Pat. No. 540,608), Pancurák et al (U.S. Pat. Nos. 8,715,469, 8,691,059 and 8,926804) and Bretschger (U.S. Pat. Pub. No. 2015/0251934).

FIELD OF THE INVENTION

The invention relates to a device for water treatment, and specifically to a water container treatment device which contains a galvanic processing unit.

DESCRIPTION OF THE RELATED ART

Standing bodies of water intended for human consumption (drinking, bathing, cooking, washing) such as pools, tanks, containers, wells, etc. need to be kept clean of sickness causing bacteria and other contaminants. Many solutions for this have been sought over the years, concentrating on either chemicals or active electrical/mechanical filtering solutions.

A favorite solution is the galvanic solution, where an ion traveling across a cathode/anode pair is used to treat the water. These solutions suffer from situations in which the chemicals are exhausted, and/or the electrical/mechanical components fail. What is needed, is a way in which to use the galvanic solution without any external power components.

SUMMARY OF THE INVENTION

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

All references, including any patents or patent applications cited in this specification are hereby incorporated by reference. No admission is made that any reference constitutes prior art. The discussion of the references states what their authors assert, and the applicants reserve the right to challenge the accuracy and pertinence of the cited documents. It will be clearly understood that, although a number of prior art publications are referred to herein, this reference does not constitute an admission that any of these documents form part of the common general knowledge in the art.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

In one aspect the invention is about a galvanic water processing apparatus comprising a first group of elongated members, said first group formed from one or more elongated members formed in all or part from a first group of metals, a second group of elongated members, said second group formed from one or more elongated members formed in all or part from a second group of metals, each said first group of elongated members placed in electrical contact with a portion of at least one member of said second elongated member group and one or more retaining rings, each said retaining ring compressing one or more members of said first group of elongated members against one or more members of said second group of elongated members. In another aspect, one or more retaining caps are placed at the end of said first and second group of elongated members assembly. In yet another aspect, said first group of metals is comprised of at least one of the metals from the group of: copper, zinc and/or silver; and said second group of metals is comprised of at least one of the metals from the group of: stainless steel and/or platinum. In another aspect, said first group and second group of elongated members is comprised of at least one shape from the group of: tubes, rods, pipes, cannulas, sticks or similar circular or similar elliptical shaped perimeters and/or multi-shaped (rectangular, pentagonal or similar multi-faceted) external shape. In yet another aspect, one or more retaining caps are placed at the end of said first and second group of elongated members assembly.

In one aspect, the invention is about a galvanic water processing apparatus comprising one or more copper, zinc and/or silver tubes in electrical contact with a central stainless steel and/or platinum tube; one or more retaining rings mechanically pressing said one or more copper, zinc and/or silver tubes to said central tube; and one or more retaining caps.

In one aspect the invention is about a galvanic water processing apparatus comprising one or more stainless steel and/or platinum tubes in electrical contact with a central copper, zinc and/or silver tube, one or more retaining rings mechanically pressing said one or more stainless steel and/or platinum tubes to said central copper, zinc and/or silver tube; and one or more retaining caps.

Other features and advantages of the present invention will become apparent upon examining the following detailed description of an embodiment thereof, taken in conjunction with the attached drawings.

Figure 1:
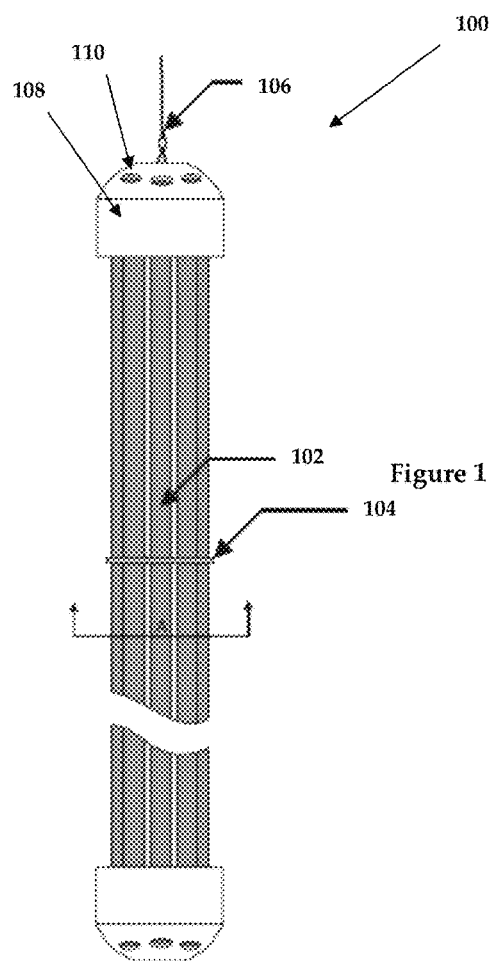
FIG. 1 shows a side view of a galvanic water processing apparatus, according to an exemplary embodiment of the invention.

The above-described and other features will be appreciated and understood by those skilled in the art from the following detailed description, drawings, and appended claims.

DETAILED DESCRIPTION OF THE PREFERRED EMBODIMENT

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

To provide an overall understanding of the invention, certain illustrative embodiments and examples will now be described. However, it will be understood by one of ordinary skill in the art that the same or equivalent functions and sequences may be accomplished by different embodiments that are also intended to be encompassed within the spirit and scope of the disclosure. The compositions, apparatuses, systems and/or methods described herein may be adapted and modified as is appropriate for the application being addressed and that those described herein may be employed in other suitable applications, and that such other additions and modifications will not depart from the scope hereof.

Simplifications or omissions may be made to avoid obscuring the purpose of the section. Such simplifications or omissions are not intended to limit the scope of the present invention. All references, including any patents or patent applications cited in this specification are hereby incorporated by reference. No admission is made that any reference constitutes prior art. The discussion of the references states what their authors assert, and the applicants reserve the right to challenge the accuracy and pertinence of the cited documents. It will be clearly understood that, although a number of prior art publications are referred to herein, this reference does not constitute an admission that any of these documents form part of the common general knowledge in the art.

As used in the specification and claims, the singular forms "a", "an" and "the" include plural references unless the context clearly dictates otherwise. For example, the term "a transaction" may include a plurality of transaction unless the context clearly dictates otherwise. As used in the specification and claims, singular names or types referenced include variations within the family of said name unless the context clearly dictates otherwise.

Certain terminology is used in the following description for convenience only and is not limiting. The words "lower," "upper," "bottom," "top," "front," "back," "left," "right" and "sides" designate directions in the drawings to which reference is made, but are not limiting with respect to the orientation in which the modules or any assembly of them may be used.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

Referring to FIG. 1 we see a proposed embodiment of a galvanic water processing apparatus 100 (also known as the Defender and/or Well Defender). This is a safe, passive, self-energizing, submersible water sanitizer for commercial and private wells, containers, and other large collections of standing water intended for human use. No chemicals or external power are required.

Wells in particular, are dynamic and in a constant state of change due to seasonal fluctuations in water levels and volume of water used or maintenance. These changes can allow bacteria to enter the well and/or infect new or existing wells alike. The Defender 100 is a self-powered device which remains in the well for a period (up to 5 years or longer) before needing replacement. There are no chemicals or external power used with this device allowing a safe and cost effective way to eliminate microorganisms in wells.

The defender reduces and or eliminates Bacteria, Fungus, Algae as well as reduces sediment formed by established bacterial colonies such as Iron bacteria. In short, the product has been designed to target Iron Bacteria, but is not limited to aiding in the reduction or elimination of other harmful microorganisms. Well Defender was designed to be added to any well, allowing the user to install the unit in conjunction with other equipment such as well pumps.

The defender 100 as a device uses the galvanic cell principle, in which two dissimilar metals (a first metal group and a second metal group) are in electrical contact with each other. In one embodiment, the first and/or second metal groups are formed into elongated members such as tubes, rods, pipes, cannulas, sticks (cylindrical or elliptically shaped) with circular or similar elliptical perimeters as well as multi-shaped (rectangular, pentagonal or any other further sided shapes).

In one embodiment, one or more central elongated members (made from all, parts or combinations from either the first or second metal group) are surrounded by one or more elongated members made from the all, parts of combinations of the alternate metal group). Similarly, the elongated members may be solid, hollow and/or various other combinations.

These elongated members may be formed from any combination of said two groups of metals, and/or be formed from similar first and second metal clad components (i.e. a composite with a metal surface but an inside formed of plastic, thermoplastic, composite, wood, ceramic, etc.) whose exterior skin is comprised of the appropriate combination of first and/or second metal groups.

In one embodiment, the first metal group is formed from one or more a metal selected from one or more of the group comprised of metals such as copper, zinc and/or silver, with the group such as copper, zinc and/or silver or portions thereof, the second metal from a second metal group such as stainless steel, platinum and/or similar non-corrosive metals or portions thereof. The metals are placed in electrical contact with each other to create a galvanic reaction between the materials which frees ions from the first group (e.g. copper ions) into the water. These copper Ions are toxic to the microorganisms but not to people or pets allowing a safe removal of the harmful organisms from the well passively.

The design of the product allows water to flow freely around and through the product to create optimal mitigation of organisms in the well without catching sediment or clogging. Materials used in this product are chosen to produce the needed galvanic effect but also chosen for their durability characteristics to produce a product with long life without degrading from the galvanic effects or corrosion.

The Defender benefits to the water qualities and well include; Microorganism mitigation, reduction in odor from Iron bacteria (Rotten egg smell), reduction in rust stains on home fixtures, cleaner clearer water, sediment reduction, extends well equipment life, extends the life of home water filtration systems, easy to install, no maintenance and no chemicals.

Figure 2:
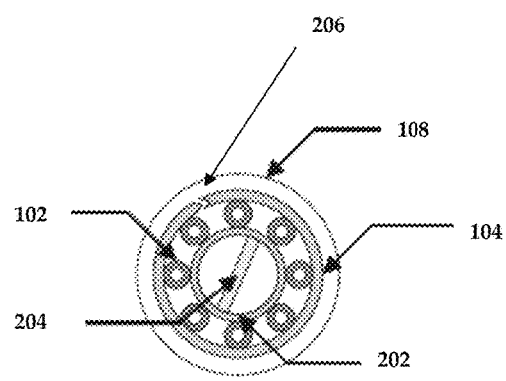
FIG. 2 shows a top view of a galvanic water processing apparatus, according to an exemplary embodiment of the invention.
Figure 4:
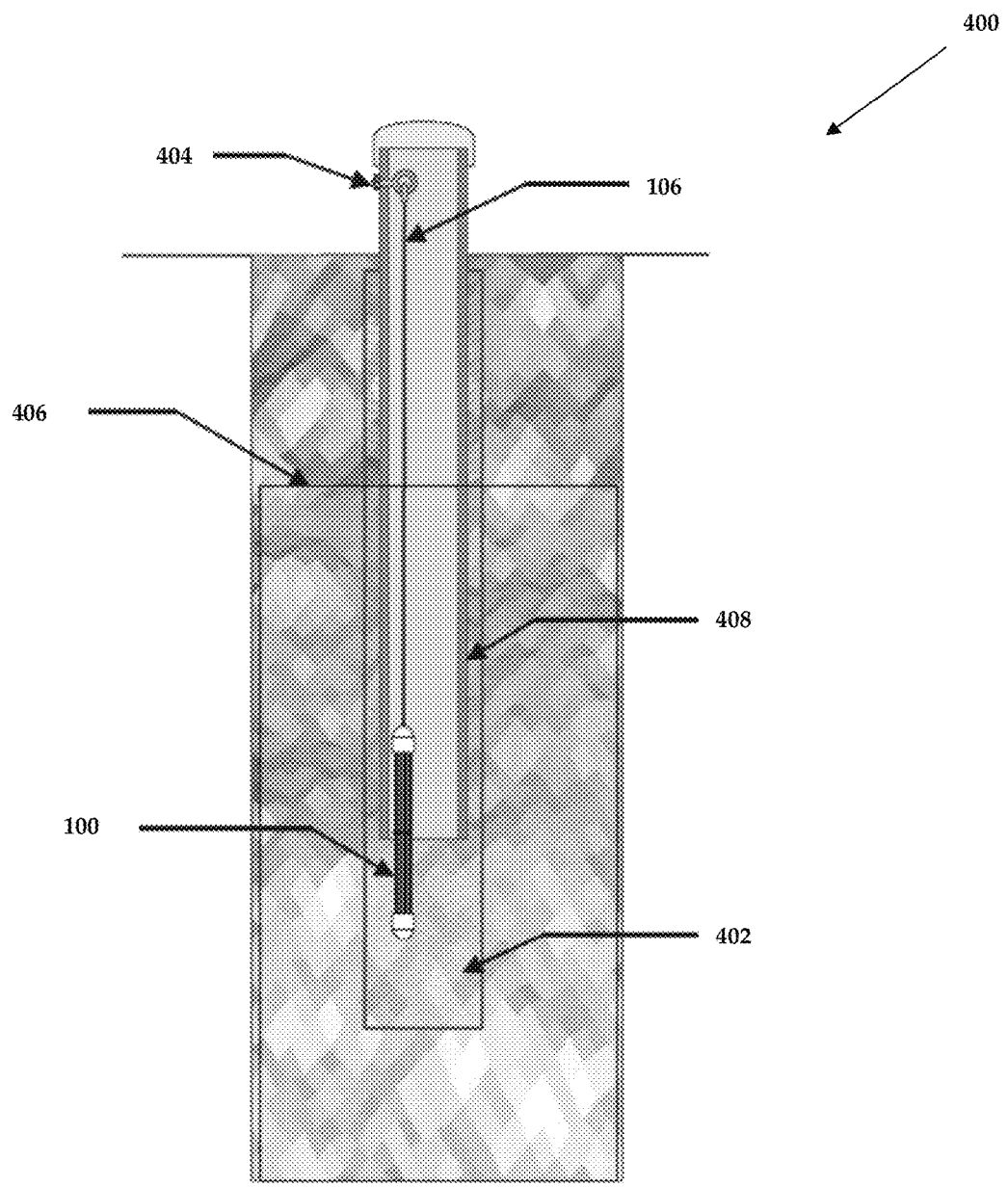
FIG. 4 shows a side view of the deployed galvanic water processing apparatus within a water well, according to an exemplary embodiment of the invention.

In one embodiment, the defender 100 is comprised of a unit designed to be immersed (FIG. 4) within the well 400 for extended periods of time. The unit 100 is comprised of one or more group one metal elongated member or tubes 102 (again, these elongated members are made into tubes in this case as an exemplary embodiment), located around the periphery of one or more (FIG. 2) central tubes 202 comprised of the second group metal (In an alternate embodiment the order of the metals may be reversed). The outer tubes 102 are kept in contact with the inner tube(s) 202 via a retainer ring 104 placed in one or more locations along the length of the defender 100.

This retainer ring 104 is critical to the invention, as over time, the group one tube(s) 102 outer surface (particularly that making contact with the central tube(s) 202 will lose material, potentially resulting in the creation of a gap between tube(s) 102 and the central tube 202, resulting in the loss and/or reduction of electrical connection (and hence the reduction of ion flow). The compression is easily accomplished by making the retainer ring 104 to a diameter smaller than that made by the one or more tube(s) 102 placed around the central tube(s), so that over time they cinch and keep the compression. In another embodiment, the ring is made of a spring coiled material.

In on embodiment, the tension over time is accomplished by making the ring 204 have a gap 206, which over time will diminish. The ring 104 may be made of metal (including those used for the tube(s) 102 and/or the central tube 202), including others such as plastics, etc. Care must be taken to ensure that if the central tube material is used, material is accounted to include the 'wear and tear' of the ring.

The ends of the Defender 100 are comprised of end caps (made of any suitable material, preferably an inert plastic, but metal, plastic, wood, Bakelite or any suitable material may be used) with one or more openings 110 to facilitate the flow of water. Similarly, in one embodiment, the tubes 102, 202 have a hollow core to facilitate similar fluid flow. They may also be solid in alternate embodiments.

Figure 3:
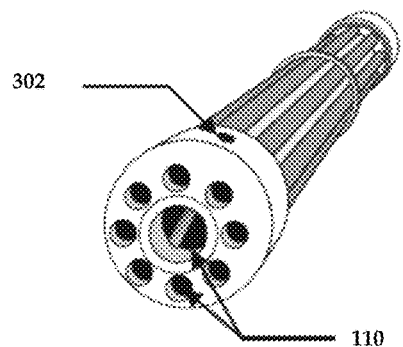
FIG. 3 shows an isometric view of a galvanic water processing apparatus, according to an exemplary embodiment of the invention.

The unit is suspended below the water table 406 within the bore hole 402 of the well or well casing 408 (preferably partially on both) via a retaining cable 106 connected at one end to top of the well and at the other to a safety pin 204 entering the retaining cap 108 through a (FIG. 3) side opening 302. This may be done through an optional retaining ring assembly 404 or other suitable means/components.

CONCLUSION

In concluding the detailed description, it should be noted that it would be obvious to those skilled in the art that many variations and modifications can be made to the preferred embodiment without substantially departing from the principles of the present invention. Also, such variations and modifications are intended to be included herein within the scope of the present invention as set forth in the appended claims. Further, in the claims hereafter, the structures, materials, acts and equivalents of all means or step-plus function elements are intended to include any structure, materials or acts for performing their cited functions.

It should be emphasized that the above-described embodiments of the present invention, particularly any "preferred embodiments" are merely possible examples of the implementations, merely set forth for a clear understanding of the principles of the invention. Any variations and modifications may be made to the above-described embodiments of the invention without departing substantially from the spirit of the principles of the invention. All such modifications and variations are intended to be included herein within the scope of the disclosure and present invention and protected by the following claims.

The present invention has been described in sufficient detail with a certain degree of particularity. The utilities thereof are appreciated by those skilled in the art. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the foregoing description of embodiments.

The invention claimed is:

1. A galvanic water processing apparatus comprising:
   a first group of elongated members, said first group formed from one or more elongated members formed in all or part from a first group of metals;
   a second group of elongated members, said second group formed from one or more elongated members formed in all or part from a second group of metals;
   each said first group of elongated members placed in electrical contact with a portion of at least one member of said second elongated member group; and
   one or more self-adjusting diameter compression retaining rings, each said retaining ring compressing one or more members of said first group of elongated members against one or more members of said second group of elongated members.

2. The apparatus of claim 1 wherein:
   one or more of said self-adjusting diameter compression retaining ring are comprised of a spring coiled material stretched around said first and second groups; and
   one or more retaining caps are placed at the end of said first and second group of elongated members assembly.

3. The apparatus of claim 1 wherein:
   one or more said self-adjusting diameter compression retaining ring are comprised of a non-continuous perimeter retainer ring having a gap, so that over time said retainer ring keeps said first and second groups in contact over time; and
   said first group of metals is comprised of at least one of the metals from the group of:
   copper, zinc and/or silver; and
   said second group of metals is comprised of at least one of the metals from the group of:
   stainless steel and/or platinum.

4. The apparatus of claim 3 wherein:
   said first group and second group of elongated members is comprised of at least one shape from the group of:
   tubes, rods, pipes, cannulas, sticks or similar circular or similar elliptical shaped perimeters and/or multi-shaped external shapes.

5. The apparatus of claim 4 wherein:
   one or more retaining caps are placed at the end of said first and second group of elongated members assembly.

6. A galvanic water processing apparatus comprising;
   one or more copper, zinc and/or silver tubes in electrical contact with a central stainless steel and/or platinum tube;
   one or more self-adjusting diameter compression retaining rings mechanically pressing said one or more copper, zinc and/or silver tubes to said central tube, wherein one or more of said self-adjusting diameter compression retaining ring are comprised of a spring coiled material stretched around said first and second groups; and one or more retaining caps.

7. A galvanic water processing apparatus comprising;

one or more stainless steel and/or platinum tubes in electrical contact with a central copper, zinc and/or silver tube;

one or more self-adjusting diameter compression retaining rings mechanically pressing said one or more stainless steel and/or platinum tubes to said central copper, zinc and/or silver tube, wherein one or more said self-adjusting diameter compression retaining ring are comprised of a non-continuous perimeter retainer ring having a gap, so that over time said retainer ring keeps said first and second groups in contact over time; and one or more retaining caps.

\* \* \* \* \*